United States Patent
Dang

(10) Patent No.: US 8,994,927 B2
(45) Date of Patent: Mar. 31, 2015

(54) DEVICE FOR MEASURING A DISTANCE TO A TARGET OBJECT

(71) Applicant: Hilti Aktiengesellschaft, Schaan (LI)

(72) Inventor: Lieu-Kim Dang, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/718,253

(22) Filed: Dec. 18, 2012

(65) Prior Publication Data

US 2013/0162970 A1 Jun. 27, 2013

(30) Foreign Application Priority Data

Dec. 23, 2011 (DE) .......................... 10 2011 089 866

(51) Int. Cl.
- *G01S 7/481* (2006.01)
- *G01C 3/08* (2006.01)
- *G01S 17/08* (2006.01)
- *G01S 7/497* (2006.01)

(52) U.S. Cl.
CPC . *G01S 7/481* (2013.01); *G01C 3/08* (2013.01); *G01S 17/08* (2013.01); *G01S 7/497* (2013.01)
USPC ........................... 356/4.01; 356/3.01; 356/4.1

(58) Field of Classification Search
CPC .................................... G01D 5/26; G01C 3/08
USPC ............. 356/3.01–3.15, 4.01–4.1, 5.01–5.15, 356/6–22
See application file for complete search history.

(56) References Cited

U.S. PATENT DOCUMENTS

| | | |
|---|---|---|
| 6,411,370 B1 | 6/2002 | Rajchel |
| 6,781,675 B2 | 8/2004 | Gogolla et al. |
| 6,922,248 B2 | 7/2005 | Steegmuller |
| 7,230,683 B2 | 6/2007 | Stierle et al. |
| 7,428,041 B2 | 9/2008 | Kallio |
| 2003/0007752 A1 | 1/2003 | Oka et al. |
| 2003/0067608 A1* | 4/2003 | Steegmuller .................. 356/496 |
| 2007/0205285 A1 | 9/2007 | Tan |
| 2010/0271614 A1 | 10/2010 | Albuguerque |

FOREIGN PATENT DOCUMENTS

| | | |
|---|---|---|
| DE | 10147987 A1 | 4/2003 |
| DE | 10213433 A1 | 10/2003 |
| DE | 20380221 U1 | 12/2004 |

OTHER PUBLICATIONS

DE Communication dated Jun. 8, 2012 in Application No. DE102011089866.2 (6 pages).

* cited by examiner

*Primary Examiner* — Luke Ratcliffe

(74) *Attorney, Agent, or Firm* — McAndrews Held & Malloy, Ltd.

(57) ABSTRACT

A measuring device for the measurement of a distance to a target object has a beam source which is designed as an electrical-optical component and which emits a transmission beam. A detector, which is designed as a further electrical-optical component, receives a reception beam that is reflected and/or scattered by the target object. A beam splitting lens is configured to deflect the transmission and/or reception beam. Alternatively or additionally, the measuring device includes a beam shaping lens is configured for shaping the transmission and/or reception beam. A lens support is configured to accommodate the electrical-optical components. The lens support also accommodates the beam splitting lens and/or the beam shaping lens. The lens support has a first wafer for accommodating the electrical-optical components and a second wafer for accommodating the beam splitting lens, and/or the beam shaping lens.

7 Claims, 3 Drawing Sheets

DEVICE FOR MEASURING A DISTANCE TO A TARGET OBJECT

CROSS-REFERENCE TO RELATED APPLICATIONS

The present application claims priority to German Patent Application DE 10 2011089 866.2, filed Dec. 23, 2011, and entitled "Messeinrichtung zur messung einer mistanz zu einem zielobjekt" ("Measuring device for the measurement of a distance to a target object"), which is hereby incorporated by reference in its entirety.

TECHNICAL FIELD

At least some embodiments of the present invention relate to a measuring device for the measurement of a distance to a target object.

BACKGROUND OF THE INVENTION

Some known measuring devices for the measurement of a distance to a target object consist of an electrical-optical component designed as a beam source, a further electrical-optical component designed as a detector, and a beam shaping system with a transmission lens and a reception lens. The beam source and the transmission lens are characterized as transmission devices, and the detector and the reception lens are characterized as receiver devices. The beam source transmits a transmission beam, which is directed by the transmission lens to the target object. A reception beam, which is reflected and/or scattered by the target object, is shaped by the reception lens and directed to the detector. The transmission and reception devices are fixed on a lens support, which is designed as a single piece or is composed of multiple pieces. The lens support can be designed as a metallic body with holders made of plastic, for example. It is disadvantageous if all the components of the measuring device must be adjusted with respect to each other and then fixed in the adjusted position, with great effort. Further, the different materials of the lens components and the lens support can lead to misadjustments as a result of temperature influence, for example.

Some measuring devices are subdivided into paraxial arrangements, wherein the optical axes of the transmission and reception devices run parallel to each other with a spacing, and coaxial arrangements, wherein the optical axes of the transmission and reception devices lie one above the other, and are separated by means of a beam splitting lens. In the case of coaxial arrangements, the transmission lens and the reception lens are integrated into a common beam shaping lens which shapes the laser beam and the reception beam.

BRIEF SUMMARY OF THE INVENTION

Aspects and embodiments of the present technology relate to developing a measuring device for the measurement of a distance to a target object to such a degree that the complexity of the manufacture of a small, compact measuring device with high measuring precision is reduced. Some aspects and embodiments of the present technology also relate to providing measuring device which is mechanically and thermally stable.

According to the certain aspects of the present technology, a lens support has a first wafer for accommodating the beam splitting lens and/or the beam shaping lens. Circular or square discs having a thickness of approximately one millimeter are characterized in the fields of microelectronics and microsystems technology as wafers. They are produced from single- or polycrystalline semiconductor blanks, and serve as the substrate for electronic components, including integrated circuits, micromechanical components, or photoelectric coatings, for example. Monocrystalline silicon, silicon carbide, gallium arsenide, and indium phosphide are used as the materials, among other materials. Glass wafers, for example made of borosilicate glass, are also used in microsystems technology.

The use of wafers for the purpose of accommodating the electrical-optical components and the beam splitting or beam shaping lenses of a measuring device has the advantage that the production of optical elements in wafers, and the attachment of highly varied components, is known, and therefore can be realized in a cost-effective manner. In addition, a measuring device, which consists of wafers stacked on top of each other has high mechanical and thermal stability. When wafers are used as lens supports, optical elements can either be manufactured separately and bonded to the wafer, or the optical elements are integrated into the wafer by means of lithographic processes.

According to at least one embodiment, the electrical-optical components are arranged coaxially, and the configuration includes a beam splitting lens for deflecting the transmission beam and/or the reception beam. At least some embodiments may include a beam shaping lens for shaping the transmission and/or reception beam. The beam shaping lens may be arranged on the second wafer or a further wafer which is situated in the beam path of the transmission beam, behind the second wafer. The beam shaping lens enables the focusing of the transmission beam and the reception beam, and therefore an increase in the quality of the distance measurement.

Some embodiments may include a scatter aperture for generating a reference beam. The scatter aperture may be arranged on the second wafer or a further wafer, which is located in the beam path of the transmission beam, behind the second wafer.

According to at least one other embodiment of the present technology, the electrical-optical components are arranged paraxially, and a beam shaping lens is included for shaping the transmission and/or reception beam. The beam shaping lens may have a first beam shaping lens for shaping the transmission beam, and a second beam shaping lens for shaping the reception beam.

Some embodiments may include scatter aperture for generating a reference beam. The scatter aperture may be arranged on the second wafer, or on a further wafer, which is arranged between the first and the second wafers.

According to at least some embodiments of the present technology, a measuring device for the measurement of a distance to a target object has a beam source which is designed as an electrical-optical component and which emits a transmission beam. A detector, which is designed as a further electrical-optical component, receives a reception beam that is reflected and/or scattered by the target object. A beam splitting lens is configured to deflect the transmission and/or reception beam. Alternatively or additionally, the measuring device includes a beam shaping lens is configured for shaping the transmission and/or reception beam. A lens support is configured to accommodate the electrical-optical components. The lens support also accommodates the beam splitting lens and/or the beam shaping lens. The lens support has a first wafer for accommodating the electrical-optical components and a second wafer for accommodating the beam splitting lens, and/or the beam shaping lens.

According to certain aspects of the present technology, the optical elements of the measuring device can be designed as separate optical elements, which are connected to the wafers.

As an alternative, the optical elements of the measuring device can be integrated into the wafer. Integration of the optical elements into the wafer has the advantage that the lens support and optical element are produced from the same material. The wafer changes under the influence of temperature evenly. Accordingly, there are no areas of the wafer, which change differently according to temperature due to different material properties. The stability of the measuring device can be increased by the integration of the optical elements into the wafer.

DETAILED DESCRIPTION

Various examples of embodiments of the present technology will be described more fully below with reference to the figures, in which examples of embodiments are shown. The embodiments are not intended to necessarily illustrate the invention comprehensively. Rather, the figures are given in a schematic and/or mildly out-of-scale form, where it serves the purpose of clarification. With regard to expansion of the teaching, which is directly recognizable in the figures, this can be found in the relevant prior art. In this case, it must be noted that numerous modifications and changes regarding the form and the detail of an embodiment can be undertaken without deviating from the general idea of the invention. The features of the invention disclosed in the description, the figures, and the claims can be essential for the implementation of the invention either individually or in any and all combinations thereof. In addition, all combinations of at least two features disclosed in the description, in the figures, and/or in the claims fall within the scope of the invention. The general idea of the invention is not restricted to the exact form or detail of the preferred embodiments shown and described below, or restricted to a subject matter, which would be limited compared to the subject matter claimed in the claims. Where measurement ranges are given, values lying inside the named boundaries are hereby disclosed as threshold values, and can be used and claimed in any manner. For simplicity, the same reference numbers are used for identical or similar parts, or parts with identical or similar functions.

Figure 1:
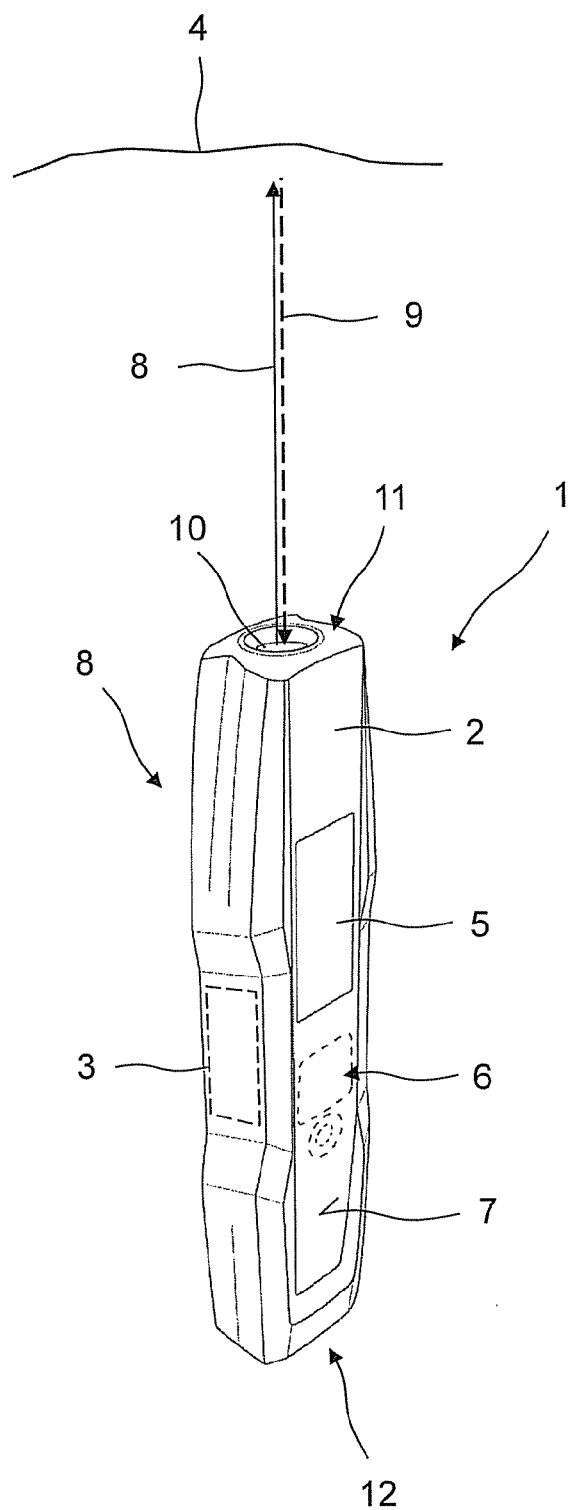
FIG. 1 shows a laser distance measuring system having a measuring device, in a three-dimensional illustration.

FIG. 1 shows a laser distance measuring system 1 in a three-dimensional illustration. The laser distance measuring system 1 comprises a housing 2, a measuring device 3, wherein the distance to a target object 4 can be measured by means of the same, a display device 5 for displaying the measured distance and an operating device 6 for starting a distance measurement and for adjusting the laser distance measuring system 1. The measuring device 3 is arranged in the interior of the housing 2, and the display and operating devices 5, 6 are embedded into an upper side 7 of the housing 2.

The measuring device 3 transmits a transmission beam 8, which is directed to the target object 4. A reception beam 9 which is reflected and/or scattered by the target object 4 is detected by the measuring device 3. The distance to the target object 4 is calculated from the time difference between the reception beam 9 and a reference beam split from the transmission beam 8. The emission of the transmission beam 8 from the housing 2, and the entrance of the reception beam 9 into the housing 2 takes place via an exit window 10 which is embedded into a front side 11 of the housing 2. The distance measurement to the target object 4 is carried out in comparison to a reference marking located on the laser distance measuring system 1. The front side 11 of the laser distance measuring system 1, or a rear side 12 lying opposite the front side 11, is used as the reference marking. Switching between the reference markings is realized via a switch device.

Figure 2:
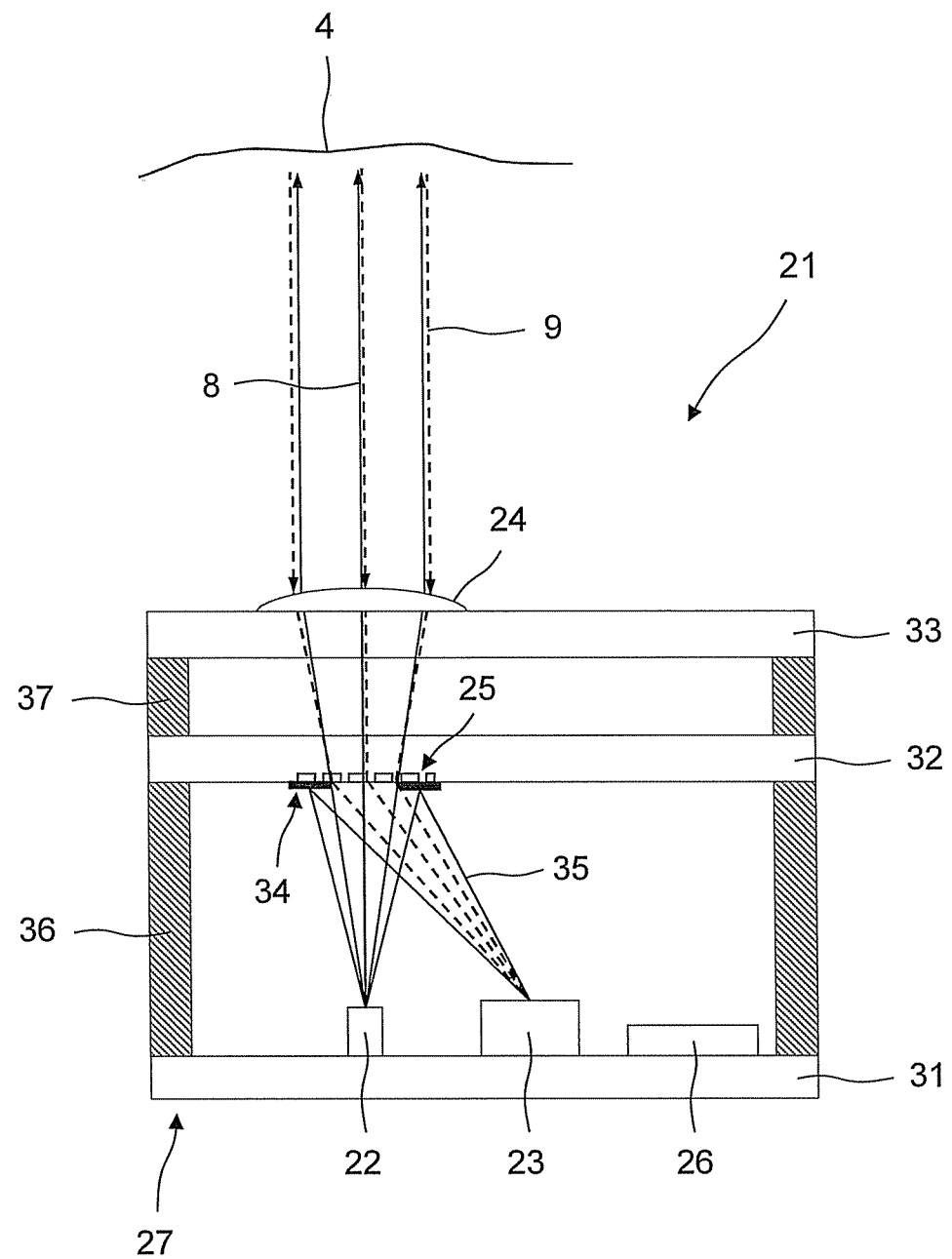
FIG. 2 shows a first embodiment of a measuring device according to certain aspects of the present technology, having a coaxial arrangement of the transmission and reception devices.

FIG. 2 shows a first embodiment of a measuring device 21 according to certain aspects of the present technology, wherein the transmission and reception devices of the measuring device are in a coaxial arrangement.

The measuring device 21 has an electrical-optical component 22 which is designed as a beam source, a further electrical-optical component 23 which is designed as the detector, a beam shaping lens 24, a beam splitting lens 25, a control and evaluation device 26, and a lens support 27. The beam source 22 may be designed as a laser diode, which generates a laser beam in the visible light spectrum, for example a red laser beam with a wavelength of 635 nm, or a green laser beam with a wavelength of 532 nm or 555 nm. The detector 23 may be designed as a photodiode, and the properties of the photodiode 23 are matched to the laser diode 22. The control and evaluation device 26 is connected to the beam source 22 and the detector 23, and determines the distance to the target object 4 from a time difference between a reference beam and the reception beam 10 detected by the detector 23, by utilizing an evaluation module. The beam shaping lens 24 may designed as a lens which shapes both the transmission beam 8 and the reflected and/or scattered reception beam 9. Due to the coaxial arrangement of the transmission and reception devices, only one single beam shaping lens 24 is required.

By means of the beam splitting lens 25, the transmission beam 8 coming from the beam source 22 and the reflected and/or scattered reception beam 9 are divided spatially. The beam splitting lens 25 is arranged in the beam path of the transmission beam 8 between the beam source 22 and the beam shaping lens 24, and in the beam path of the reception beam 9 between the beam shaping lens 24 and the detector 23. The beam splitting lens 25 functions to separate the transmission beam 8 and the reception beam 9 from each other.

In at least some embodiments, the lens support 27 may be configured to accommodate all optical, electrical-optical, and electronic components 22-26 of the measuring device 21. The lens support 27 may have a first wafer 31 for the electrical-optical components 22, 23, a second wafer 32 for the beam splitting lens 25, and a third wafer 33 for the beam shaping lens 24. The beam splitting lens 25 can alternatively be integrated into the third wafer 33, or can be integrated into the emission surface of the beam shaping lens 24, or can be fixed on the second or third wafers 32, 33 as a separate optical element, for example. The beam splitting lens 25 may be designed as a polarizing beam splitting, for example.

In addition to the electrical-optical components 22, 23, the control and evaluation device 26 may also arranged on the first wafer 31. The control and evaluation device 26 may also be included on another wafer than the first wafer 31. Because the control and evaluation device 26 must also be connected to the electrical-optical components 22, 23, however, the arrangement on the first wafer 31 offers the advantage that the connection lines can be integrated into the first wafer 31.

The second wafer 32 may have a scatter aperture 34 in addition to the beam splitting lens 25, and the scatter aperture [34] splits a reference beam 35 from the transmission beam 8. The control and evaluation device 26 determines the distance to the target object 4 from the time difference between the arrival of the reference beam 35 and the arrival of the reception beam 9 at the detector 23.

In order to ensure a trouble-free measure operation of the measuring device 21, the various components 22-26 of the measuring device 21 need to be adjusted with respect to each other, and be fixed in the adjusted position. For this purpose, the wafers 31, 32, 33, with the components 22-26, are adjusted, and then fixed via spacers at the adjusted distance. The first and second wafers 31, 32 are oriented with respect to each other via a first spacer 36, and the second and third wafers 32, 33 via a second spacer 37, and then fixed.

The coaxial measuring device 21 can alternatively be operated with the beam shaping lens 24, or a beam shaping lens is used which is not accommodated in the lens support 27. Then, the spatially separated beam shaping lens is operated together with the lens support 27. This arrangement is preferred in the event that a large diameter of the transmission beam is required, which requires a larger beam shaping lens in order to enlarge the distance being measured.

Figure 3:
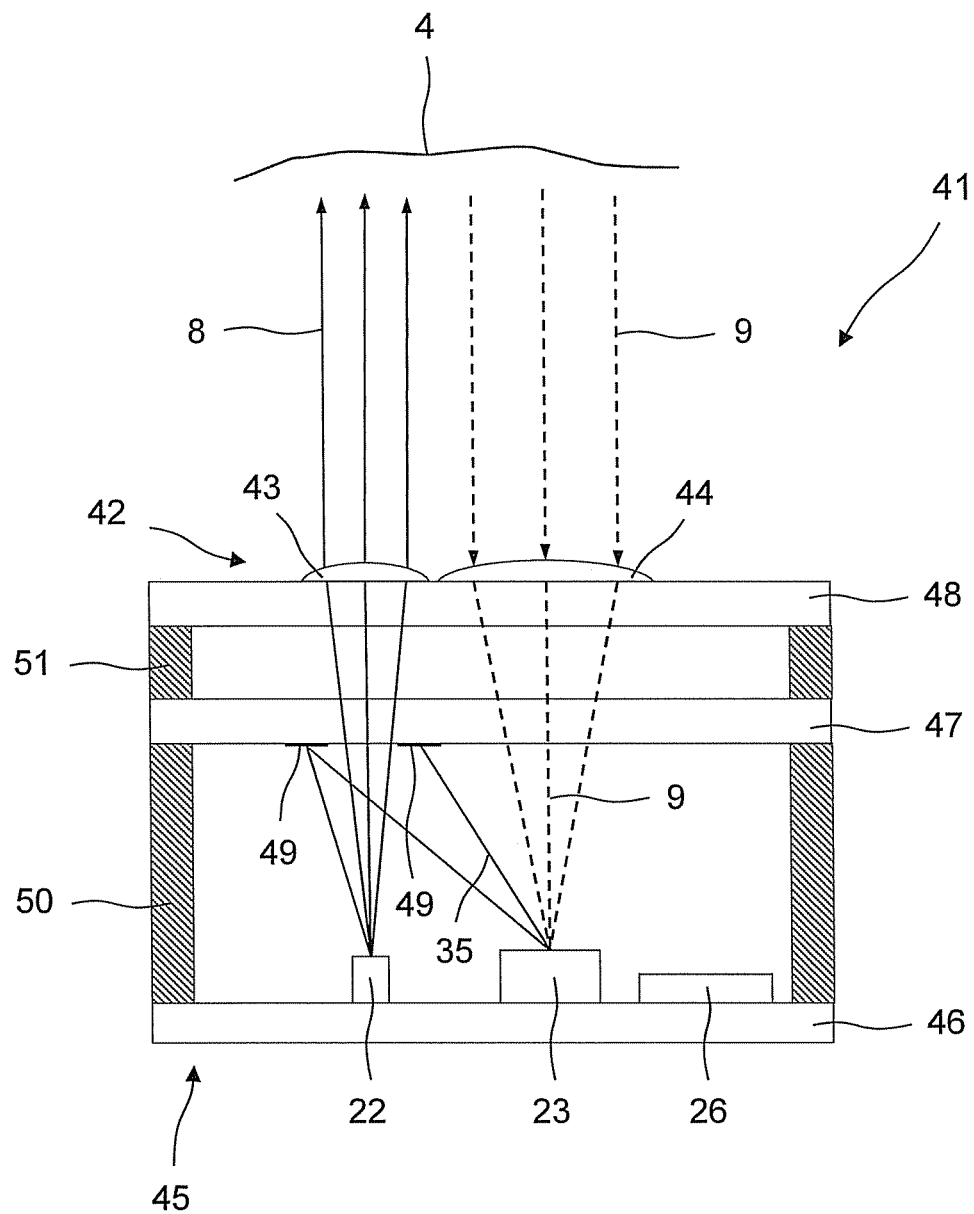
FIG. 3 shows a second embodiment of a measuring device according to certain aspects of the present technology, having a paraxial arrangement of the transmission and reception devices.

FIG. 3 shows a second embodiment of a measuring device 41 according to certain aspects of the present technology, wherein the transmission and reception devices of the measuring device have a paraxial arrangement.

The measuring device 41 has, like the measuring device 21, the beam source 22, the detector 23, and the control and evaluation device 26. Because the beam source 22 and the detector 23 are arranged paraxially, the measuring device 41 does not have a beam splitting lens. The measuring device 41 differs from the measuring device 21 in the construction of the beam shaping lens 42. The beam shaping lens 42 consists of a first beam shaping lens 43 for shaping the transmission beam 8, and a second beam shaping lens 44 shaping the reception beam 9.

The measuring device 41 has a lens support 45, which accommodates the components 22, 23, 26, 43, 44 of the measuring device 41. The lens support 45 may include a first wafer 46 for the electrical-optical components 22, 23 and the control and evaluation device 26, and a second wafer 47 for the first and second beam shaping lenses 42, 44.

The lens support 45 may also include a third wafer 48 for a scatter aperture 49, by means of which the reference beam 35 is split from the transmission beam 8. The scatter aperture 49 can alternatively be arranged on the second wafer 47, or, in the event that further wafers are included for accommodating components of the measuring device 41, the scatter aperture [49] can be arranged on one of these wafers. Any element which produces a scattering of the incident transmission beam 8 is suitable as the scatter aperture 49. The scatter aperture can be fixed on the wafer as a separate optical element, or can be produced in the wafer by means of lithographic processes.

Similar to the wafers 31, 32, 33 of the lens support 27, the wafers 46, 47, 48 may be held in position via spacers 50, 51. The spacers 50, 51 may be glued to the wafers, for example. The first and third wafers 46, 48 may be connected to each other via the first spacer 50, and the second and third wafers 47, 48 are connected to each other via the second spacer 51.

The invention claimed is:

1. A measuring device for measuring a distance to a target object, comprising:
   a beam source which is designed as an electrical-optical component and which emits a transmission beam;
   a detector which is designed as a further electrical-optical component and which receives a reception beam which is reflected and/or scattered by the target object;
   a beam splitting lens configured to deflect the transmission and/or reception beam;
   a beam shaping lens configured to shape the transmission and/or reception beam; and
   a lens support configured to accommodate the electrical-optical components and to accommodate the beam splitting lens and/or the beam shaping lens,
   wherein the lens support has a first wafer that accommodates the electrical-optical components, a second wafer that accommodates the beam splitting lens and a third wafer that accommodates the beam shaping lens,
   wherein the beam splitting lens is arranged in the beam path of the transmission beam between the beam source and the beam shaping lens and in the beam path of the reception beam between the beam shaping lens and the detector.

2. A measuring device according to claim 1, wherein the first and second wafers are connected to each other via at least one spacer.

3. A measuring device according to claim 1, wherein the electrical-optical components are arranged coaxially.

4. A measuring device according to claim 3, further comprising a scatter aperture configured to generate a reference beam, wherein the scatter aperture is arranged on the second wafer or on a further wafer which is located behind the second wafer in the beam path of the transmission beam.

5. A measuring device according to claim 1, wherein the optical elements are designed as separate optical elements.

6. A measuring device according to claim 1, wherein the optical elements are integrated into the wafers.

7. A measuring device according to claim 1, wherein the second and third wafers are connected to each other via at least one spacer.

* * * * *